United States Patent
Freier et al.

(10) Patent No.: US 9,910,578 B2
(45) Date of Patent: Mar. 6, 2018

(54) USER INTERFACE FOR CONTROLLING A BATHROOM PLUMBING FIXTURE WITH OUTLET AND FLOW PATTERN SELECTION SCREENS

(71) Applicant: Kohler Co., Kohler, WI (US)

(72) Inventors: Donald P. Freier, Sheboygan, WI (US); Rafael Alfredo Rexach, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 326 days.

(21) Appl. No.: 14/727,301

(22) Filed: Jun. 1, 2015

(65) Prior Publication Data

US 2015/0268848 A1  Sep. 24, 2015

Related U.S. Application Data

(63) Continuation of application No. 13/012,193, filed on Jan. 24, 2011, now Pat. No. 9,128,495, which is a
(Continued)

(51) Int. Cl.
*G06F 3/0484* (2013.01)
*G06F 3/0482* (2013.01)
(Continued)

(52) U.S. Cl.
CPC .......... *G06F 3/04847* (2013.01); *E03C 1/055* (2013.01); *G05D 23/1393* (2013.01);
(Continued)

(58) Field of Classification Search
CPC .... G06F 1/1656; G06F 3/0362; G06F 3/0482; G06F 3/0484; G06F 3/04842;
(Continued)

(56) References Cited

U.S. PATENT DOCUMENTS

| | | |
|---|---|---|
| 3,317,829 A | 5/1967 | Kuhrt et al. |
| 3,711,672 A | 1/1973 | Moreland |

(Continued)

FOREIGN PATENT DOCUMENTS

| | | | |
|---|---|---|---|
| EP | 0 313 913 | 5/1989 | |
| EP | 1609402 | * 12/2005 | ............... A47K 3/28 |
| JP | 2006171355 | 6/2006 | |

OTHER PUBLICATIONS

Non-Final Office Action for U.S. Appl. No. 29/431,717, dated May 30, 2014, 14 pages.
(Continued)

*Primary Examiner* — Keith Crawley
(74) *Attorney, Agent, or Firm* — Foley & Lardner LLP

(57) ABSTRACT

A user interface for controlling a plumbing fixture includes an electronic display configured to display multiple different graphical menus for controlling a plurality of valves. The user interface includes a selector control configured to receive input from a user for navigating the multiple different graphical menus and for selecting items displayed in the multiple different graphical menus. A controller receives a first user input from the selector control and causes the electronic display to switch from displaying one of the graphical menus to another of the graphical menus in response to the first user input. The controller receives a second user input from the selector control and causes the plurality of valves to make multiple different adjustments in response to the second user input based on which of the multiple different graphical menus are displayed when the second user input is received.

18 Claims, 4 Drawing Sheets

Related U.S. Application Data continuation of application No. 11/737,864, filed on Apr. 20, 2007, now Pat. No. 7,889,187.

(51) Int. Cl.
 *E03C 1/04* (2006.01)
 *E03C 1/05* (2006.01)
 *G05D 23/13* (2006.01)

(52) U.S. Cl.
 CPC ........ *G06F 3/0482* (2013.01); *G06F 3/04842* (2013.01); *E03C 1/0408* (2013.01)

(58) Field of Classification Search
 CPC ............... G06F 3/04847; G06F 3/0485; E03C 2001/0418; E03C 1/055; E03C 1/057; E03C 1/0408; G05D 23/1393; A61H 33/005; A61H 2033/007; A61H 2033/0075; A61H 2033/0079; A61H 2033/0083; A61H 2033/0058
 See application file for complete search history.

(56) References Cited

U.S. PATENT DOCUMENTS

| | | | |
|---|---|---|---|
| 3,867,652 A | 2/1975 | Bjorklund et al. | |
| 4,054,860 A | 10/1977 | Henderson | |
| 4,054,861 A | 10/1977 | Markison | |
| D253,044 S | 10/1979 | Hewson | |
| 4,199,741 A | 4/1980 | Serrus Paulet | |
| 4,415,856 A | 11/1983 | Welles | |
| 4,420,811 A | 12/1983 | Tarnay et al. | |
| 4,682,728 A | 7/1987 | Oudenhoven et al. | |
| 4,756,030 A | 7/1988 | Juliver | |
| 4,812,804 A | 3/1989 | Masaki | |
| 4,854,498 A | 8/1989 | Stayton | |
| 4,854,499 A | 8/1989 | Neuman | |
| 4,869,427 A | 9/1989 | Kawamoto et al. | |
| 4,901,915 A | 2/1990 | Sakakibara | |
| 4,909,435 A | 3/1990 | Kidouchi et al. | |
| 4,923,116 A | 5/1990 | Homan | |
| 4,945,943 A | 8/1990 | Cogger | |
| 4,965,894 A | 10/1990 | Baus | |
| 4,974,636 A | 12/1990 | Cogger | |
| 5,058,804 A | 10/1991 | Yonekubo et al. | |
| 5,121,511 A | 6/1992 | Sakamoto et al. | |
| D344,684 S | 3/1994 | Metz et al. | |
| 5,358,177 A | 10/1994 | Cashmore | |
| 5,414,879 A | 5/1995 | Hiraishi et al. | |
| 5,428,850 A | 7/1995 | Hiraishi et al. | |
| D381,313 S | 7/1997 | Krajci et al. | |
| 5,757,180 A | 5/1998 | Chou et al. | |
| D402,571 S | 12/1998 | Pasquarette et al. | |
| 5,920,131 A | 7/1999 | Platt et al. | |
| 5,936,613 A | 8/1999 | Jaeger et al. | |
| 5,944,531 A | 8/1999 | Foley et al. | |
| 5,979,775 A | 11/1999 | Rava | |
| 5,979,776 A | 11/1999 | Williams | |
| 5,994,045 A | 11/1999 | Bourdelais et al. | |
| 6,101,451 A | 8/2000 | Smith et al. | |
| 6,188,332 B1 | 2/2001 | Scarlata | |
| D440,207 S | 4/2001 | Carson et al. | |
| 6,225,980 B1 | 5/2001 | Weiss et al. | |
| 6,233,757 B1 | 5/2001 | Graham et al. | |
| 6,250,558 B1 | 6/2001 | Dogre Cuevas | |
| 6,286,764 B1 | 9/2001 | Garvey et al. | |
| 6,438,770 B1 | 8/2002 | Hed et al. | |
| D462,253 S | 9/2002 | Caveney et al. | |
| 6,498,326 B1 | 12/2002 | Knappe | |
| 6,812,435 B2 | 11/2004 | Schilling | |
| 6,879,863 B2 | 4/2005 | Mueller | |
| 6,925,661 B1 | 8/2005 | Anger | |
| D509,127 S | 9/2005 | Millward et al. | |
| D523,823 S | 6/2006 | McLellan et al. | |
| 7,084,859 B1 | 8/2006 | Pryor | |
| 7,126,072 B2 | 10/2006 | Saitoh | |
| D548,049 S | 8/2007 | Millward et al. | |
| D553,096 S | 10/2007 | Pfingsten et al. | |
| 7,281,214 B2 | 10/2007 | Fedell | |
| D563,908 S | 3/2008 | Kohler | |
| 7,369,850 B2 | 5/2008 | Andrwe et al. | |
| D580,951 S | 11/2008 | Niizawa et al. | |
| 7,504,598 B2 | 3/2009 | Weigold | |
| D591,182 S | 4/2009 | Schoenherr et al. | |
| D598,305 S | 8/2009 | Li et al. | |
| D607,571 S | 1/2010 | Pratt | |
| 7,642,886 B2 | 1/2010 | Boss | |
| D612,274 S | 3/2010 | Heidemann et al. | |
| D613,627 S | 4/2010 | Wang | |
| D613,994 S | 4/2010 | Murphy et al. | |
| 7,705,838 B2 | 4/2010 | Kinerk et al. | |
| D615,624 S | 5/2010 | Allard et al. | |
| D628,276 S | 11/2010 | Allard | |
| D628,678 S | 12/2010 | Allard et al. | |
| 7,860,536 B2 | 12/2010 | Jobs et al. | |
| D631,946 S | 2/2011 | Allard | |
| 7,889,187 B2 * | 2/2011 | Freier | G05D 23/1393 251/129.01 |
| D633,522 S | 3/2011 | Trabona et al. | |
| D642,894 S | 8/2011 | Soper et al. | |
| D658,519 S | 5/2012 | Connolly et al. | |
| D666,508 S | 9/2012 | Beland et al. | |
| D667,460 S | 9/2012 | Wujcik et al. | |
| D667,550 S | 9/2012 | Eby et al. | |
| D667,739 S | 9/2012 | Saitou | |
| D669,865 S | 10/2012 | Gilbert et al. | |
| D673,176 S | 12/2012 | Phelan | |
| 8,358,278 B2 | 1/2013 | Lim et al. | |
| 8,416,198 B2 | 4/2013 | Rathnam et al. | |
| D681,654 S | 5/2013 | Hirsch et al. | |
| D684,872 S | 6/2013 | Bias et al. | |
| D685,657 S | 7/2013 | Hu | |
| D688,696 S | 8/2013 | Phelan | |
| D699,130 S | 2/2014 | Rhodes et al. | |
| D699,596 S | 2/2014 | Hu | |
| D700,849 S | 3/2014 | Bremenkamp | |
| D725,234 S | 3/2015 | Barber | |
| D725,235 S | 3/2015 | Barber | |
| D725,237 S | 3/2015 | Barber | |
| 9,128,495 B2 * | 9/2015 | Freier | G05D 23/1393 |
| 2002/0175828 A1 * | 11/2002 | Macey | G07C 9/00182 340/4.11 |
| 2003/0027545 A1 | 2/2003 | Tobishima | |
| 2003/0045796 A1 | 3/2003 | Josephson et al. | |
| 2003/0229404 A1 | 12/2003 | Howard et al. | |
| 2004/0204779 A1 | 10/2004 | Mueller et al. | |
| 2004/0257068 A1 | 12/2004 | Wolber et al. | |
| 2005/0072850 A1 * | 4/2005 | Cornwall | G05D 23/1393 236/12.15 |
| 2006/0071917 A1 | 4/2006 | Gomez et al. | |
| 2007/0159316 A1 | 7/2007 | Mischel et al. | |
| 2007/0226645 A1 | 9/2007 | Kongqiao et al. | |
| 2007/0246550 A1 * | 10/2007 | Rodenbeck | E03C 1/057 236/12.11 |
| 2008/0271238 A1 | 11/2008 | Reeder et al. | |
| 2010/0020012 A1 | 1/2010 | Oh | |
| 2010/0321202 A1 * | 12/2010 | Laflamme | A61H 33/005 340/12.53 |

OTHER PUBLICATIONS

First Examination Report for Indian Patent Application No. ELEC/2014/1549, dated Dec. 11, 2014, 2 pages.
Office Action on U.S. Appl. No. 29/431,717 dated Dec. 11, 2014, 7 pages.
Kohler.com, "The Bold Look of Kohler Catalog" pages, Kohler Co.
Kohler.com, "Bodies of Water Design Catalog" pages, Kohler Co.
PCT Search report in a counterpart Application PCT/US2007/009770, 10 pages.
Official Action dated Apr. 27, 2010 in EP Application No. 07 775 954.6.

(56) References Cited

OTHER PUBLICATIONS

U.S. Non Final Office Action dated Jul. 1, 2016, from related U.S. Appl. No. 29/542,942.

* cited by examiner

USER INTERFACE FOR CONTROLLING A BATHROOM PLUMBING FIXTURE WITH OUTLET AND FLOW PATTERN SELECTION SCREENS

CROSS-REFERENCE TO RELATED PATENT APPLICATIONS

This application is a continuation of U.S. patent application Ser. No. 13/012,193, filed Jan. 24, 2011, which is a continuation of U.S. patent application Ser. No. 11/737,864, filed Apr. 20, 2007, both of which are incorporated by reference herein in their entireties.

BACKGROUND

1. Field of the Invention

The present invention relates to plumbing fixtures, such as bathroom showers and whirlpools, and more particularly to an electrical control system for operating components of the plumbing fixture and specifically to a user interface of the control system.

2. Description of the Related Art

High end bathroom shower systems provide multiple showerheads mounted on the ceiling and walls of a shower enclosure to direct water onto the bather from multiple directions. Some of these showerheads are similar to those found in standard single showerhead showers, while others provide unconventional spray patterns. For example, the WaterTile (trademark Kohler Co.) showerhead has 22 nozzles that provide a series of water cascades, while other showerheads emit water in a sheet flow. Such a shower enclosure typically has several different types showerheads to provide a variety of water flow effects.

The water flow to each showerhead is individually controlled by a separate electrically operated valve. In addition to regulating the on/off flow rate, the valve can provide a constant flow or a pulsated flow to produce a massaging effect replicating the rhythmic manipulation of tissue performed by a masseur or masseuse. The different electrically operated valves also can be opened and closed sequentially to create continuously changing water patterns within the shower enclosure.

The bathing experience is further enhanced by a plurality of different colored lamps that are independently controlled to produce light of varying intensity and color in the shower enclosure. Speakers also provide music, radio news programs and other audio performances to the bather. A steam generator may turn the shower enclosure into a steam bath, when desired.

Because of the relatively large number of functions that are provided on a top of the line shower system, its operation is governed by a microcomputer based control system. While such computerized control simplifies the hardware necessary to operate all the valves, lights, audio equipment, steam generator and other shower components, the bather still has to select which of the numerous functions are to be active and choose parameters for the selected functions. Heretofore, this required a complex user control panel.

Thus, there is a need for a simple, easy to use interface by which the bather is able to individually control the numerous functions on a state of the art shower system. Because the interface is intended for location in a wet environment, it must be watertight.

SUMMARY

A user interface produces signals for controlling a plumbing fixture, such as a shower system for example, that has electrically operated components. The user interface includes an enclosure that has a faceplate with an exterior surface. A display is provided on which alphanumeric characters, symbols and icons are presented to a user of the plumbing fixture. The display is visible through the exterior surface of the faceplate.

Several user operable input devices are incorporated into the enclosure. A plurality of switches respond to the user pressing a different portion of the faceplate. A selector has a pedestal that projects outward from and is affixed to the faceplate in a watertight manner. A selector ring is rotatably positioned around the pedestal and contains a plurality of permanent magnets arranged annularly. A Hall effect sensor is located adjacent the selector ring and produces an electrical signal in response to motion of the selector ring.

In a preferred embodiment of the user interface, a controller receives the electrical signal from the Hall effect sensor and determines from that signal whether the selector ring is rotating clockwise or counterclockwise around the pedestal.

Another aspect of the present user interface is a wireless remote control by which the user also is able to control the plumbing fixture. The a wireless remote control comprises a first switch for activating and deactivating the plumbing fixture, a second switch for selecting one of a plurality of preset operating configurations for the plumbing fixture, and a visual indicator designating which of the plurality of preset operating configurations has been selected.

DETAILED DESCRIPTION

Although the present invention is being described in the context of controlling a bathroom shower system, it has equal applicability to controlling a whirlpool tub, toilet, or other plumbing fixture. The term "plumbing fixture" as used herein includes a water enclosure, such as a tub, shower enclosure or toilet, as well as the plumbing fittings and components that control the flow of water to and from the water enclosure. However, "plumbing fixture" does not include white goods, such as clothes washing machines, dishwashers and the like.

Figure 1:
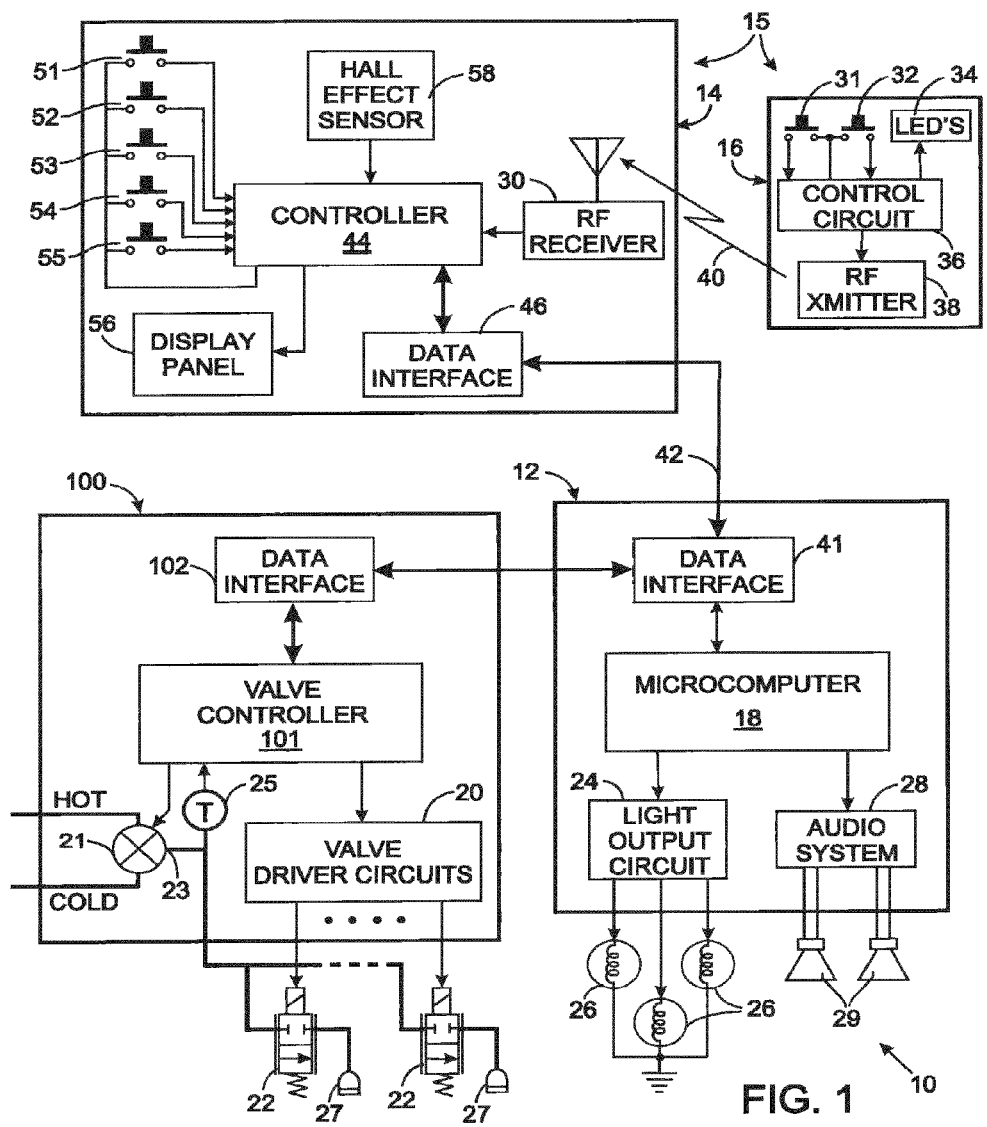
FIG. 1 is a block schematic diagram of an electronic control system for operating a plumbing fixture.

With initial reference to FIG. 1, a control system 10 electrically operates various components of a shower system, such as valves that control the flow of water to a plurality of shower heads, different colored lights within the shower enclosure, and an audio system that provides music or radio programming to the bather. The control system 10 includes a primary controller 12, a user control panel 14, and a wireless remote control 16. The user control panel 14 and wireless remote control 16 collectively form a user interface 15 for the control system. In a typical installation, the primary controller 12 is mounted within a wall adjacent to the shower enclosure and the user control panel 14 is located on a wall of that shower enclosure for access by the bather.

The primary controller 12 is based around a commercially available microcomputer 18 that includes a processor, a memory for storing control programs and data and input/output circuits for interfacing with other components of the primary controller. Other outputs of the microcomputer 18 are connected to a light output circuit 24 that controls the application of electricity to a plurality of light bulbs 26 mounted in the ceiling and walls of the shower enclosure. The microcomputer 18 also controls the operation of an audio system 28 with speakers 29 mounted within the shower enclosure. The audio system 28 comprises equipment for providing music, radio programming, or other types of audio from different sources and is controlled by the bather via the user control panel 14. The microcomputer 18 communicates via data interface 41 to a data interface 102 in a digital valve 100.

The digital valve 100 has a valve controller 101 with outputs connected to a plurality of valve driver circuits 20 that provide signals for operating a plurality of valves 21 and 22. A mixing valve 21 selectively combines water from hot and cold sources to produce water at an outlet 23 that has a temperature desired by the bather. That temperature is measured by a sensor 25 which provides a temperature indication signal to the valve controller 101. The mixing valve outlet 23 is connected to a several solenoid operated valves 22 that control the flow of water to the different shower heads 27 within the shower enclosure. Each solenoid operated valve may feed one or more shower heads. The valve controller 101 also can open and close the valve in a rapid sequence to provide a pulsed flow of water to the shower head 27.

The user control panel 14 exchanges control signals with the primary controller 12 through a cable 42. Specifically one end of the cable 42 is connected to a first data interface 41 in the primary controller 12 and the opposite end is coupled to a second data interface 46 in the user control panel 14. The two data interfaces 41 and 46 convert data between a parallel format used with the user control panel 14 and the primary controller 12 and a serial format by which the data are transmitted over the cable. The user control panel 14 is based around a controller 44 that includes a microprocessor and a memory for storage of a control program and data. The controller 44 has ports connected to user input and output devices of the user control panel.

Figure 2:
FIG. 2 illustrates the faceplate of a user interface for the control system.

With additional reference to FIG. 2 which shows the faceplate 45 of the user control panel 14, the controller 44 is connected to a plurality of momentary contact switches 51, 52, 53, and 54, such as capacitive switches or membrane switches integrated into the exterior surface of the faceplate. The momentary contact switches and the arrangement of other input/output devices on the faceplate 45, as will be described, avoid the need for holes in the control panel faceplate 45, and thus prevent water within the shower enclosure from penetrating into the user control panel 14. The first momentary contact switch 51 toggles the control system 10 between on and off states. Second and third momentary contact switches 52 and 53 enable a bather to select one of six different preset operating configurations of the shower system which have been previously stored in the control system 10. For example, after a bather has manually set up the shower system to provide a particular water pattern, lighting, and audio selection, that entire operating configuration can be stored as one of the six preset operating configurations. On a subsequent use of the shower enclosure, the bather can restore the shower system to that one of those preset operating configuration by using either the second or third momentary contact switch 52 or 53. The bather selects a particular preset operating configuration by pressing the appropriate switch 52 or 53 a respective number of times. For example, to select the fifth stored configuration, the bather presses the third momentary contact switch 53 twice. This enables different people to quickly set up the shower system according to their individual preferences. It also enables the same person to have several preset operating configurations to use at different times, such as a morning shower, a workout shower, and an evening shower.

The user control panel 14 has a display 56, such as an LCD panel, on which alphanumeric characters and symbols are displayed to the bather. The control panel faceplate 45 has a transparent section that extends over the display in a seamless manner thereby providing a watertight exterior surface of the faceplate so that water cannot penetrate into the user control panel. A fourth momentary contact switch 54 returns information on the display 56 to a previous information screen, as will be described. The user control panel 14 also includes a rotary selector 60 that is used for a number of input functions depending upon the particular information being presented on the display 56. For example, in FIG. 2 the display 56 contains a list of four different water outlet devices, i.e. a spray head, a hand shower, and two body sprays, that are operated by the control system 10. By rotating a selector ring 62 of the selector 60, an input signal is sent to the controller 44 to cause the displayed information to sequentially highlight each of the four output devices in reversed fonts. For example, FIG. 2 shows the Shower Head highlighted which highlighting designates that particular item of information shown on the display. The selector ring 62 can be rotated either clockwise or counterclockwise to respectively move the highlighting down and up the displayed list, respectively. The bather can select the highlighted item by pressing a fifth momentary contact switch 55 in the center of the selector 60. That action signals the controller 44 that the bather has selected the presently highlighted item being displayed. As will be described in greater detail, the selector ring 62 has a plurality of permanent magnets that activate a commercially available Hall effect sensor 58 located behind the control panel faceplate 45 to provide a signal to the controller 44 that indicates not only motion of the selector ring 62, but the clockwise or counterclockwise direction of that motion.

Figure 3:
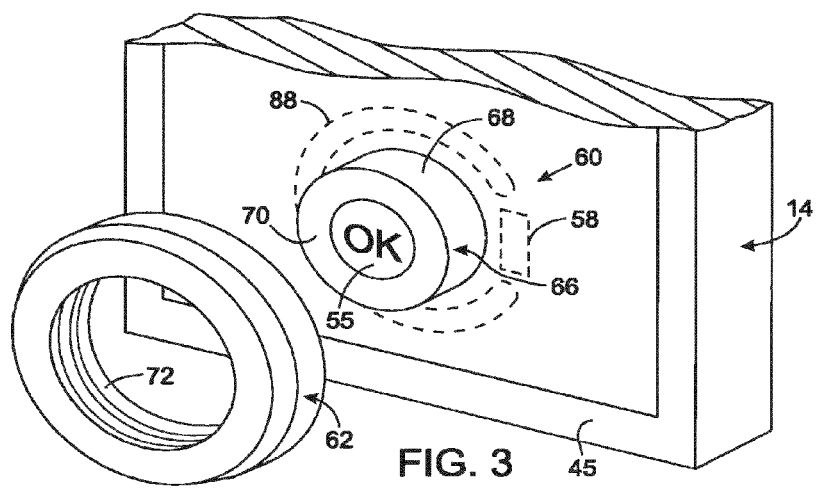
FIG. 3 illustrates a selector ring of a rotary input device that has been removed from the user interface.

The selector 60 has a unique physical construction which enables the faceplate 45 to have a continuous, uninterrupted exterior surface, that does not have any holes or other openings, thereby preventing water from entering the user control panel 14. With particular reference to FIG. 3, the selector 60 comprises a circular, cylindrical pedestal 66 projecting outward from the faceplate 45 in a seamless manner thereby providing a watertight exterior surface of the faceplate. Preferably, the faceplate 45 and the pedestal 66 are molded as a single piece of plastic. The pedestal 66 has a curved side surface 68 and a flat end surface 70 on which the fifth momentary contact switch 55 is mounted. The fifth momentary contact switch 55, along with the other four switches on the faceplate 45, are membrane type switches integrated into the exterior surface of the faceplate 45, thereby also enabling that surface to be contiguous and unbroken.

With continuing reference to FIGS. 2 and 3 the selector ring 62, the selection ring, which is removable from the faceplate 45, has an interior circumferential surface 72 with a diameter that is slightly larger than the exterior diameter of the pedestal 66. This arrangement allows the selector ring 62 to be rotated around the pedestal 66.

Figure 4:
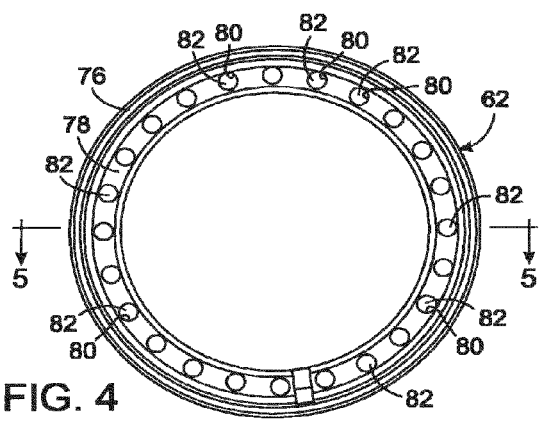
FIG. 4 is a view of one flat face of the control ring.
Figure 5:
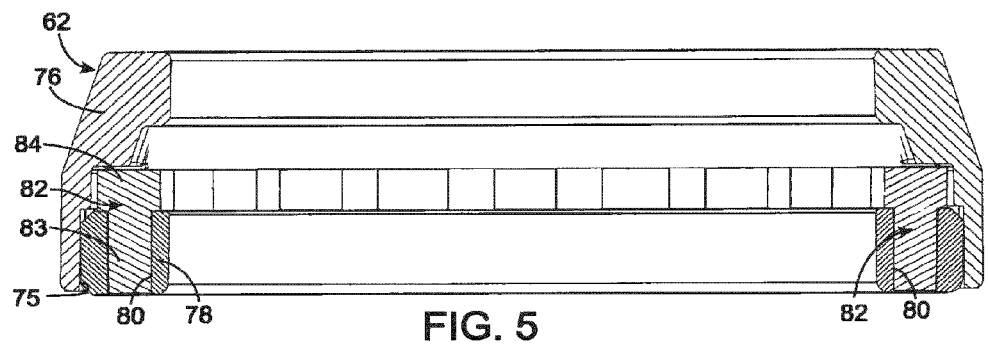
FIG. 5 is a cross sectional view along line 5-5 in FIG. 4.

With reference to FIGS. 4 and 5, the selector ring 62 has an outer annular shell 76 that has a bore 75 within which an annular magnet retainer 78 fits and is held therein by snap tabs, adhesive or other fastening technique. The magnet retainer 78 has a plurality of apertures 80 extending between its two planar surfaces and a separate permanent magnet 82 is received within each aperture. Every permanent magnet 82 has a round shaft 83 projecting through the respective aperture 80 and a head 84, at an interior end of the shaft, which head is held between the shell 76 and the magnet retainer 78 when those latter components are secured together. The magnet head 84 prevents the magnets from sliding completely through the apertures 80. The opposite, exterior end of the shaft 83 of each permanent magnet 82 is exposed through the opening of the aperture 80 on a first side 85 of the selector ring 62. There are an even number of permanent magnets 82 arranged circumferentially around the selector ring 62 with their north and south poles alternating. Specifically if the north pole of a given permanent magnet is exposed on the first side 85 of the selector ring, and the adjacent permanent magnets on both sides of that given magnet have their south poles exposed on the first side. For example, there are 24 permanent magnets spaced a 15° increments annularly around the selector ring 62. The Hall effect sensor 58, such as model A3425 from Allegro MicroSystems, Inc. of Worcester, Mass. 01606 U.S.A., has two active Hall effect elements spaced closer together than the magnet spacing so that only one element at a time senses a permanent magnet as the selector ring rotates around the pedestal. This enables the controller 44 to determine the direction that the selector ring 62 is rotating from the Hall effect sensor signal.

As shown in FIG. 3, a C-shaped body 88 of magnetic material, such as steel, is embedded in the control panel faceplate 45 around the pedestal 66. The Hall effect sensor 58 is located at the opening of that C-shaped body. In a preferred embodiment of the present invention, the C-shaped body 88 is molded into the plastic of the faceplate 45, but alternatively it can be secured to either the inner or outer surface of the faceplate by adhesive or other fastening technique which does not penetrate entirely through the faceplate. As a result, when the selector ring 62 is placed around the pedestal 66, many of the permanent magnets 82 are attracted to the C-shaped body 88, thereby holding the selector ring against the faceplate 45. Thus the same magnets 82 which are used by the Hall effect sensor 58 to detect motion of the selector ring 62 also hold that selector ring in place on the faceplate 45. However, this magnetic attraction allows a bather to pull the selector ring 62 away from the faceplate 45 for cleaning and other purposes. Because the user control panel 14 is intended to be mounted vertically or horizontally on a shower enclosure wall, the pedestal 66 passing through the selector ring 62 also aids in holding the selector ring in place against the force of gravity.

With reference again to FIG. 2, the exemplary information presented on the display 56 illustrates the outlet selection menu, which provides a list of the different shower heads and other water outlets in the shower enclosure. The bather is able to scroll up or down through this list by rotating the selector ring 62 counterclockwise or clockwise, respectively, about the pedestal 66. That rotational movement is detected by the Hall effect sensor 58 to provide a signal that is sent to the controller 44 within the user control panel 14. In response to that signal, the controller changes the item in the list of water outlets that is highlighted for selection by the bather. More than four water outlets can be scrolled through with designations of additional outlets appearing as the bath scrolls upward from the top of the list or downward from the bottom of the list.

Figure 6:
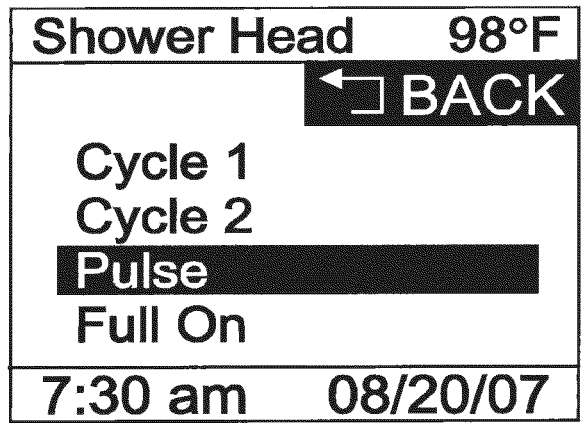
FIGS. 6 and 7 depict different types of information being presented on a display of the user interface.

When the desired water outlet is highlighted by reversed font, the bather indicates that desired selection by pressing the fifth momentary contact switch 55 at the center of the pedestal 66. This turns on the solenoid valve 22. As used herein the term "information screen" refers to the information being presented on the display 56 and not to the hardware of that display device. On the new information screen, the bather can now scroll through a number of water flow patterns to select the one that is desired for the selected water outlet, in this case the pulsing flow from the shower head. Near the upper right corner of the information screen in FIG. 6, is an indication that by pressing the return, or fourth, momentary contact switch 54 on the user control panel, the display will return to the previous information screen, in this case the outlet selection screen shown in FIG. 2. Other information screens, such as one for programming the preset operating configurations, can be accessed from a main system menu screen to which access is gained by pressing the return momentary contact switch 54 a sufficient number of times.

Figure 7:
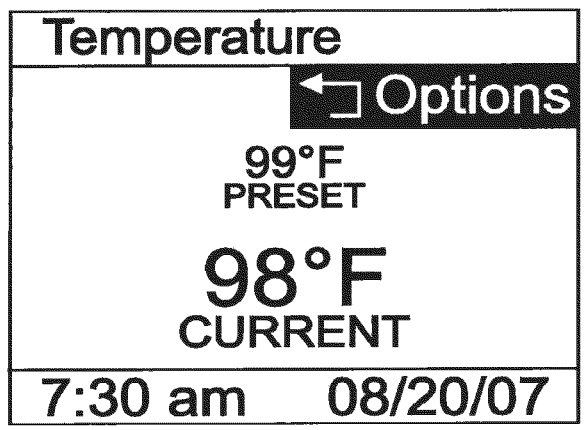

The information screen in FIG. 2 indicates that by pressing the return, or fourth, momentary contact switch 54, a temperature control screen shown in FIG. 7 will be displayed. For this information screen, the display 56 presents the current temperature of the water flowing through the various outlets and the preset temperature that the bather has indicated previously is desired for that flow. When this information screen is presented on the display 56, rotation of the selector ring 62 increases or decreases the preset, or desired, temperature depending upon the direction of that rotation. This designated preset temperature is conveyed from the user control panel 14 to the primary controller 12, and particularly to the microcomputer 18. In response, the microcomputer 18 sends data through the data interface 41 to the data interface 102 in the digital valve 100. The valve controller 101 uses this information to alter the position of the mixing valve 21 to change the ratio of hot and cold supply water to produce a desired outlet temperature for the water sent to the individual control valves 22. The valve controller 101 also receives a signal from the temperature sensor 25 indicating the outlet water temperature and responds to that sensor signal also by operating the mixing valve 21 to achieve the desired temperature.

Figure 8:
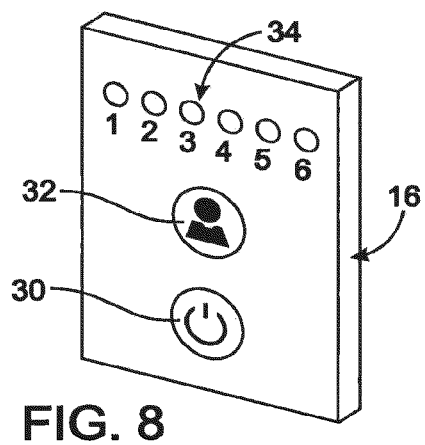
FIG. 8 is a perspective view of a wireless remote control for the shower control system.

With reference to FIGS. 1 and 8, a bather also is able to initiate operation of the shower system using a hand-held, remote control 16 that transmits commands to a radio frequency (RF) receiver 30 within the user control panel 14. The wireless remote control 16 has a pair of momentary contact switches 31 and 32 for respectively turning on and off the control system 10 and selecting from among the plurality of preset operating configurations of the shower system. The selection of a particular preset operating configuration is indicated by a plurality of light emitting diodes (LED's) 34. The switches 31 and 32 and the light emitting diodes 34 are connected to a control circuit 36 that responds to the activation of those switches by providing a digital code to a radio frequency transmitter 38. The radio frequency transmitter 38 modulates a radio frequency carrier signal with that digital data and transmits the resultant RF signal 40 to the radio frequency receiver 30 within the user control panel 14.

Pressing the first momentary contact switch 31 on the remote control, alternately turns the control system 10 on and off. For example, the bather is able to turn on the shower system while in bed so that the water temperature will reach the desired level by the time the bather enters the shower enclosure. The second momentary contact switch 32 on the remote control 16 is employed to select one of the six preset operating configurations for the shower system. Repeatedly pressing the second momentary contact switch 32 through each of the six preset operating configurations with the LED's 34 indicating the number of the currently designated configuration. After the bather has illuminated the LED corresponding to the desired preset operating configuration, the bather releases the second momentary contact switch 32. When the designation of a preset operating configuration remains unchanged for a given period of time, e.g. five seconds, the control circuit 36 sends a digital code indicating that preset operating configuration to the radio frequency transmitter 38. That digital code then is transmitted via the radio frequency signal 40 to the RF receiver 30 within the user control panel 14.

The RF receiver decodes the radio frequency signal 40 and extracts the digital code indicating the selected preset operating configuration which is then sent to the controller 44. In response to the receipt of that selection, the microcomputer 18 communicate to the digital valve 100 which in turn operates the water valves 21 and 22, the light bulbs 26, and the audio system 28 according to the information stored previously for that selected preset operating configuration. Therefore, the remote control 16 allows the bather to set up the shower system for a desired bathing experience before entering the shower enclosure where the user control panel 14 is located.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A control system for a plumbing fixture, the control system comprising:
   a plurality of valves, each of the valves fluidly connected to one or more water outlets and configured to control a flow of water to the one or more water outlets;
   a user control panel comprising an electronic display configured to display multiple different information screens comprising graphical menus for controlling the plurality of valves and a selector control configured to receive input from a user for navigating the graphical menus and for selecting items displayed in the graphical menus, the information screens including:
      an outlet selection screen comprising an outlet selection menu that provides a list of the water outlets and allows a user to select one or more of the listed water outlets via the selector control; and
      a flow pattern selection screen comprising a flow pattern menu that provides a list of flow patterns for a selected water outlet and allows a user to select one or more of the listed flow patterns via the selector control; and
   a controller in communication with the plurality of valves and the user control panel, wherein the controller receives a first user input from the selector control and causes the electronic display to switch from displaying the outlet selection screen to displaying the flow pattern screen in place of the outlet selection screen in response to a selection of one or more of the water outlets listed in the outlet selection menu via the selector control;
   wherein the controller receives a second user input from the selector control and causes the plurality of valves to make multiple different adjustments to the flow of water in response to the second user input based on which of the multiple different graphical menus are displayed when the second user input is received.

2. The control system of claim 1, wherein the user control panel comprises a seamless front panel extending over the electronic display and providing a watertight exterior surface of the user control panel, wherein the electronic display is visible through the seamless front panel.

3. The control system of claim 2, wherein the selector control comprises a plurality of switches, each switch responding to a user pressing a different portion of the seamless front panel, wherein one of the switches is configured to receive the first user input and another of the switches is configured to receive the second user input.

4. The control system of claim 2, wherein the selector control comprises a plurality of switches, each switch responding to a user pressing a different portion of the seamless front panel, wherein one of the switches is configured to select a preset operating configuration and another of the switches is configured to toggle the control system between on and off states.

5. The control system of claim 1, wherein the controller causes the outlet selection menu to switch from displaying a first subset of the listed water outlets to a second subset of the listed water outlets in response to a user input received via the selector control.

6. The control system of claim 1, wherein the first user input is the selection of one or more of the water outlets listed in the outlet selection menu;
   wherein the second user input is a selection of a flow pattern listed in the flow pattern menu and the controller causes the plurality of valves to provide the selected flow pattern in response to the second user input.

7. The control system of claim 1, wherein the multiple different graphical menus comprise a temperature control menu that displays a current temperature and a setpoint temperature for the water provided to one or more of the water outlets;
   wherein the second user input is an adjustment to the setpoint temperature in the temperature control menu and the controller causes the plurality of valves to adjust a temperature of the water provided to the one or more water outlets in response to the second user input.

8. The control system of claim 1, wherein the multiple different graphical menus comprise a programming menu that provides interface options for programming a preset operating configuration.

9. The control system of claim 1, further comprising:
   a radio frequency (RF) receiver connected to at least one of the controller and the user control panel; and
   a wireless remote control configured to communicate with the RF receiver;
   wherein the controller causes the plurality of valves to make multiple different adjustments to the flow of water in response to a user input received via the wireless remote control.

10. The control system of claim 1, wherein the multiple different graphical menus comprise interface options for controlling multiple different shower subsystems comprising:

a water control system comprising the plurality of valves and configured to control a flow of water to the one or more water outlets located within a shower enclosure;

an audio system comprising speakers located within the shower enclosure; and a lighting control system comprising a plurality of lighting devices located within the shower enclosure.

11. A user interface for controlling a plumbing fixture, the user interface comprising:

an electronic display configured to display multiple different information screens comprising graphical menus for controlling a plurality of valves, the information screens including:

an outlet selection screen comprising an outlet selection menu that provides a list of water outlets and allows a user to select one or more of the listed water outlets; and a flow pattern selection screen comprising a flow pattern menu that provides a list of flow patterns for a selected water outlet and allows a user to select one or more of the listed flow patterns;

a selector control configured to receive input from a user for navigating the multiple different graphical menus and for selecting items displayed in the multiple different graphical menus; and a controller that receives a first user input from the selector control and causes the electronic display to switch from displaying the outlet selection screen to displaying the flow pattern screen in place of the outlet selection screen in response to a selection of one or more of the water outlets listed in the outlet selection menu via the selector control;

wherein the controller receives a second user input from the selector control and causes the plurality of valves to make multiple different adjustments in response to the second user input based on which of the multiple different graphical menus are displayed when the second user input is received.

12. The user interface of claim 11, further comprising a seamless front panel extending over the electronic display and providing a watertight exterior surface of the user interface, wherein the electronic display is visible through the seamless front panel.

13. The user interface of claim 12, wherein the selector control comprises a plurality of switches, each switch responding to a user pressing a different portion of the seamless front panel, wherein one of the switches is configured to receive the first user input and another of the switches is configured to receive the second user input.

14. The user interface of claim 12, wherein the selector control comprises a plurality of switches, each switch responding to a user pressing a different portion of the seamless front panel, wherein one of the switches is configured to select a preset operating configuration and another of the switches is configured to toggle the user interface between on and off states.

15. The user interface of claim 11, wherein the controller causes the outlet selection menu to switch from displaying a first subset of the listed water outlets to a second subset of the listed water outlets in response to a user input received via the selector control.

16. The user interface of claim 11, wherein the first user input is the selection of one or more of the water outlets listed in the outlet selection menu;

wherein the second user input is a selection of a flow pattern listed in the flow pattern menu and the controller causes the plurality of valves to provide the selected flow pattern in response to the second user input.

17. The user interface of claim 11, wherein the multiple different graphical menus comprise a temperature control menu that displays a current temperature and a setpoint temperature for a flow of water controlled by the plurality of valves;

wherein the second user input is an adjustment to the setpoint temperature in the temperature control menu and the controller causes the plurality of valves to adjust a temperature of the water provided to one or more water outlets in response to the second user input.

18. The user interface of claim 11, wherein the multiple different graphical menus comprise interface options for controlling multiple different shower subsystems comprising:

a water control system comprising the plurality of valves and configured to control a flow of water to one or more water outlets located within a shower enclosure;

an audio system comprising speakers located within the shower enclosure; and a lighting control system comprising a plurality of lighting devices located within the shower enclosure.

\* \* \* \* \*